United States Patent [19]

Russell et al.

[11] 3,977,846
[45] Aug. 31, 1976

[54] ANTI-POLLUTION METHOD

[75] Inventors: Allen S. Russell, New Kensington; Noel Jarrett, Lower Burrell; Marshall J. Bruno, Greensburg; John A. Remper, Lower Burrell, all of Pa.; Larry K. King, Maryville, Tenn.

[73] Assignee: Aluminum Company of America, Pittsburgh, Pa.

[22] Filed: Aug. 20, 1973

[21] Appl. No.: 388,881

Related U.S. Application Data

[63] Continuation-in-part of Ser. No. 291,060, Sept. 21, 1972, abandoned, which is a continuation-in-part of Ser. No. 178,079, Sept. 7, 1971, Pat. No. 3,811,916.

[52] U.S. Cl. .................................................. 55/79
[51] Int. Cl.² ....................................... B01D 53/06
[58] Field of Search ............ 55/74, 77, 79, 82, 390; 117/46 CB

[56] References Cited

UNITED STATES PATENTS

| | | | |
|---|---|---|---|
| 3,177,631 | 4/1965 | Tamura | 55/79 X |
| 3,443,360 | 5/1969 | Reeves | 55/71,82 |
| 3,503,184 | 3/1970 | Knapp et al. | 55/71 |
| 3,719,029 | 3/1973 | Suzukawa et al. | 55/91 |
| 3,811,916 | 5/1974 | Russell et al. | 117/46 CB |

*Primary Examiner*—Charles N. Hart
*Assistant Examiner*—Robert H. Spitzer
*Attorney, Agent, or Firm*—John P. Taylor

[57] ABSTRACT

Use of a temperature-controlled heat-exchanger comprising fluidized particles to remove hydrocarbons from gas contaminated therewith and prevent hydrocarbon pollution of the atmosphere.

9 Claims, 1 Drawing Figure

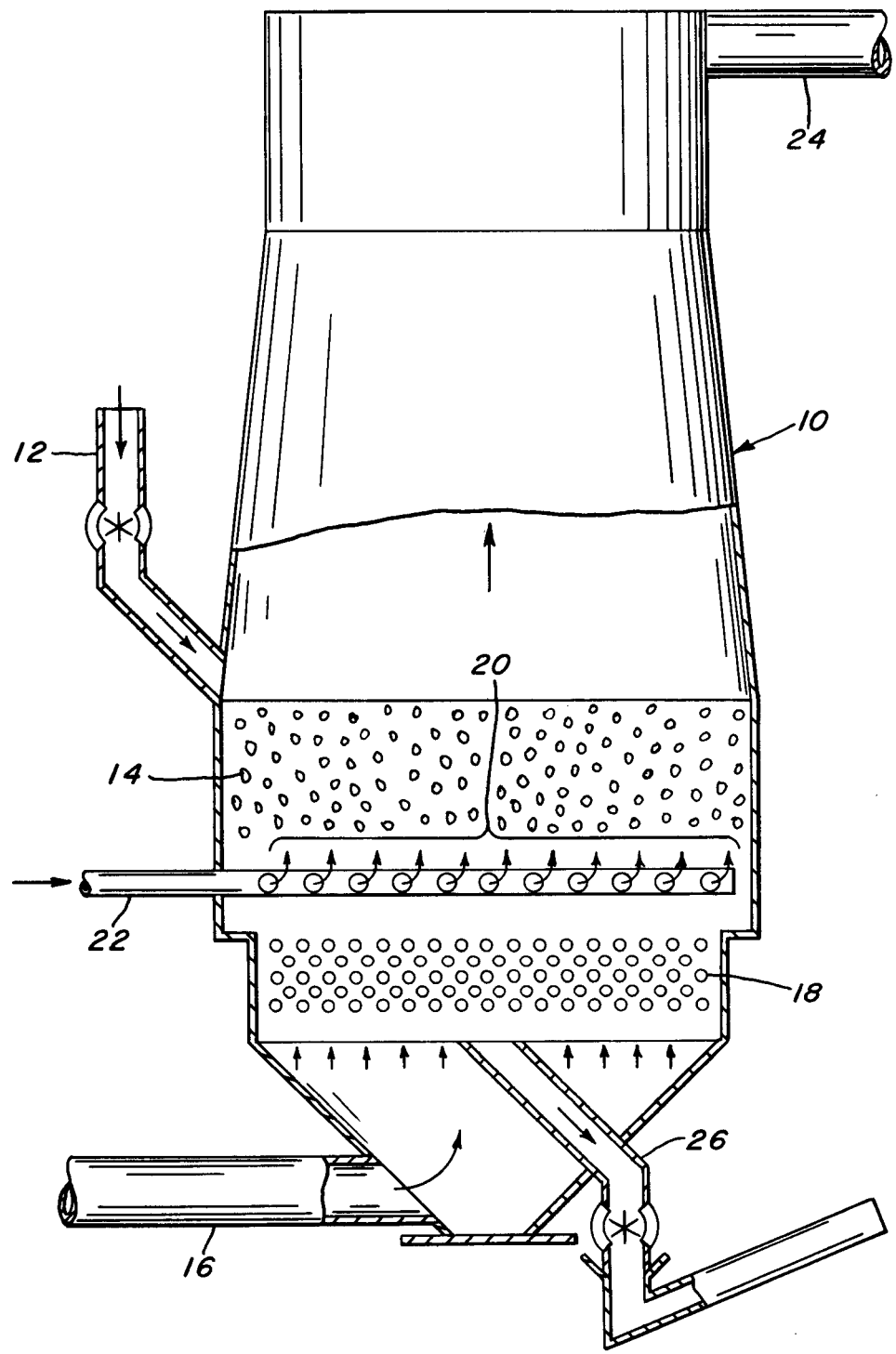

ANTI-POLLUTION METHOD

BACKGROUND OF THE INVENTION

1. Field of the Invention

This is a continuation-in-part of Ser. No. 291,060, filed Sept. 21, 1972 and now abandoned, which was a continuation-in-part of Ser. No. 178,079, filed Sept. 7, 1971, now U.S. Pat. No. 3,811,916.

This invention relates to prevention of air pollution by hydrocarbons. More particularly, it relates to removal of hydrocarbons from gas contaminated therewith by deposition on fluidized particles in a temperature-controlled heat exchanger.

2. Description of the Prior Art

One of the sources of pollution today is the discharge into the atmosphere of hydrocarbons resulting from, among several sources, various industrial chemical processes. Many ways have been proposed to minimize discharge of hydrocarbon-contaminated gas into the atmosphere, but until now none has been found which will remove substantially all hydrocarbon discharge, particularly from gases containing only minor amounts of hydrocarbons, sometimes as little as less than about 0.1% by weight. Minor quantities of objectionable hydrocarbons are found, for example, in gases produced by heating or baking hydrocarbon-bonded carbonaceous bodies such as electrodes, aluminum electrolysis potroom exhaust gases, fumes emitted by delacquering recycled cans or can scrap, oily fumes emitted by forge presses, gases emitted when hot pitch and coke are being mixed, and the like.

On the other hand, with respect to solving the problem of how to separate gases from one another, it has been proposed in U.S. Pat. No. 2,601,298, which involves a process for production of oxygen by the liquefaction and rectification of air, to prevent deposition of tars on the cooling surfaces of a heat exchanger by bringing fluidized particles such as adsorptive carbon into contact with the cooling surfaces to adsorb condensable tarry vapors contained in hot gases undergoing cooling to a temperature below their condensation point. If one attempts to apply such a refrigeration type system to the removal of hydrocarbons from waste gas contaminated therewith, however, other problems are encountered.

In the condensation of hot waste gases containing tarry hydrocarbon residues, it has been found that the efficient use of a heat exchanger comprising fluidized particles for deposition of the hydrocarbon components of the hot vapors on the solid particles therein requires the use of a distribution plate beneath the particles. As is well known to those skilled in the art, the use of a distribution plate creates a plenum from which fluidizing gas can flow through the openings in the plate to create a uniform pressure drop across the entire area of the plate.

However, the use of such a plate in a process for the deposition of such hydrocarbon residues creates problems in that the openings in the distribution plate tend to become plugged with the tarry hydrocarbon residues in the fluidizing medium caused by premature condensation of the hydrocarbon vapors unless the plate is heated or the like.

SUMMARY OF THE INVENTION

Therefore in accordance with the invention the removal of undesirable hydrocarbons from a gas is accomplished by fluidizing or suspending solid particles maintained at a temperature below the condensation temperature of the undesirable hydrocarbons with an independent fluidizing medium which is substantially free of hydrocarbons which are condensable under ambient conditions, and then introducing said hydrocarbon-contaminated gas into the zone of suspended particles at a temperature above the hydrocarbon condensation temperature at a point spaced from the entry point of said fluidizing medium and at a velocity sufficient to prevent counterflow of the particles at the point of entry. Preferably the hydrocarbon-contaminated gas is introduced through an entry port at a point spaced from the walls of the heat exchanger and is thermally isolated from the suspended particles by heating or insulation means to avoid premature condensation and plugging at the point of entry and to insure adequate contact between the hydrocarbon-contaminated gas and the fluidized particles.

BRIEF DESCRIPTION OF THE DRAWING

For a better understanding of the invention, reference will now be made to the drawing, which forms a part hereof.

The drawing illustrates one type of heat exchanger comprising a fluidized bed arrangement which may be used according to the invention to remove gaseous hydrocarbons from a stream of gas containing same. In this illustration the gas originates from baking carbon electrodes.

DESCRIPTION OF THE INVENTION

Referring now to the hydrocarbon removal apparatus 10 of the drawing, sufficient solid particulate is introduced via line 12 to a fluidized bed 14 to maintain a desired depth, for example, from about 15 to about 30 inches. A separate gaseous fluidizing medium such as air is introduced via line 16. Bed 14 may be cooled to hydrocarbon condensation temperature by a water-cooled heat exchange unit 18. Gaseous effluent from the electrodes being baked is introduced to bed 14 at openings 20, which, according to the invention, may be insulated or specially heated, via line 22. Exit line 24, which leads to a dust collector or like unit (not shown), is for discharge of gases leaving unit 10 from which the hydrocarbons have been removed by deposition on the fluidized solid particles. Drain 26, or a side overflow arrangement (not shown), is for removal of solid particulate from bed 14. If desired, for cooling the bed, instead of using a cooling unit such as 18, coolant such as water may be introduced directly into bed 14, for example, by means of jets as described and claimed in copending application Ser. No. 291,049 by Schoener, filed Sept. 21, 1972 and assigned to the assignee of this invention. By introducing a hydrocarbon-contaminated gas at a temperature above the hydrocarbon condensation temperature into the fluidized bed of solid particles while maintaining the bed at a temperature not exceeding this condensation temperature, and by introducing the hydrocarbon-contaminated gas at a point spaced from the walls of the bed as well as from the entry of the fluidizing media, the objectionable hydrocarbons in the gas are not condensed until after entry into the fluidized bed, but after entry thereinto are deposited on the particles, the gas thereby being decontaminated or purified by separation from the particles containing the hydrocarbons.

Best results are obtained according to our fluidized particle hydrocarbon removal process by maintaining the particles at a temperature not exceeding about 125°C and preferably from about 35°C to about 80°C, the optimum not exceeding about 60°C, the temperature of entrance to the deposition zone always being at least slightly above the temperature of the particles thus preventing condensation and possible plugging of the entrance, as explained hereinabove.

The use of the term "hydrocarbons" herein is intended to embrace condensable bituminous materials having five or more carbon atoms which condense from the gaseous or vapor state to the liquid state and which, in the case of the heavier molecules, can comprise tarry, viscous liquids. Such bituminous materials include asphaltic or paraffinic type petroleum residues as well as coal-based derivatives such as coal tar.

Preferred material for use as the fluidized particles includes alumina, carbon, sand, calcium carbonate, silica and sorptive, pigment or particulate-type substances capable of collecting hydrocarbons on the surface thereof.

Preferably, the fluidizing medium is a relatively clean gas such as filtered ambient air or nitrogen. In accordance with the invention, the fluidizing medium should be substantially free of hydrocarbons depositable on the fluidized particles. When a distribution plate is used, the fluidizing medium should be essentially free of any material condensable on the distribution plate which would otherwise interfere with maintaining the desired volume of flow of fluidizing medium through the openings in the plate.

While we do not wish to be bound by any particular theory of the deposition mechanism, it appears that the hydrocarbons are deposited on the fluidized particles by one or more of the following: condensation, physical sorption, chemical sorption, and chemical reaction (when media are reactive).

The structure or type of heat exchanger used according to the invention is not critical. It may be of any one of several arrangements, for example, one containing the solid particles in a relatively fixed location, for example, at a depth of from a few inches to several feet through which the gas containing the hydrocarbons, and the separate fluidizing medium pass with random mixing in the fluidized particles or one in which the solid particles pass through an elongated zone.

The hydrocarbon removal process of the invention is particularly well suited for treatment of gas emitted upon baking carbonaceous bodies, such as electrodes, bonded by a hydrocarbon-containing material such as pitch. Such baking usually consists of heating in a furnace or kiln or the like, for example, a tunnel kiln, a ring furnace or a similar-type heating unit. Illustrative of one type of furnace or kiln the gas from which may be treated to remove hydrocarbons therefrom according to the invention are the ring furnaces of U.S. Pat. Nos. 1,330,164; 1,330,175 and 1,383,378.

According to the invention one or more beds containing fluidized solid particles for deposition of hydrocarbons thereon may be used for gases coming from one or more kilns or separate sources.

To keep the gas at the required temperature above the hydrocarbon condensation temperature prior to and at entry into the heat exchanger containing the fluidized particles, the entry line and orifice may be insulated or heated.

According to a preferred embodiment of the invention, the heat exchanger chamber containing the fluidized particles may be maintained within the required condensation temperature range by active cooling, for example, by use of a heat exchanger such as one which employs circulated coolant, as in a condenser. When the solid particles and gas from which the hydrocarbons are to be removed move concurrently in a rapidly flowing stream, the effluent gas leaving the heat exchanger chamber may be passed to a cyclone separator and/or a dust collector such as a bag filter, or a plurality of bag filters in a baghouse arrangement, for removal of remaining solids therefrom.

While the size of the fluidized particles is not critical according to the invention, alumina commonly referred to as metal-grade alumina or smelting-grade alumina usually having an average particle size of $-100$ mesh to $+325$ mesh has been found useful according to the invention.

The solid particles with hydrocarbons deposited thereon may be removed from the heat exchanger either substantially continuously or at intervals, for example, as shown in the prior art-type fluidized bed of Knapp et al, U.S. Pat. No. 3,503,184, where an alumina bed is used for removal of fluorides from effluent gas from Hall-type electrolytic cells for the production of aluminum. They may be recycled, if desired, after removal of the hydrocarbons therefrom, for example, by burning them off or dissolving them in a wash solvent.

The terms "fluidizing" and "fluidized bed" are intended to define a state of suspension of solid particles wherein the velocity of the fluidizing medium ranges from at least sufficient to provide adequate separation of the solid particles to enable uniform heat transfer throughout the suspension zone to wherein the velocity of the fluidizing medium may be sufficiently high to provide complete entrainment of the particles into the gas stream as in a transport system. Intermediate fluidizing medium velocities such as, for example, in a dilute phase system, may, of course, be used in accordance with the invention.

The amount of hydrocarbons removed from the gas being treated by the fluidized particles according to the invention may range from as low as about 1½ to 2 mg/SCF (standard cubic foot) of gas when the gas being treated comes from baking hydrocarbon-bonded electrodes, to as high as 15 mg/SCF or higher.

For a further understanding of the invention, reference will now be made to the following examples, which are illustrative thereof.

EXAMPLE 1

A system similar to that depicted in FIG. 1 was employed to remove hydrocarbons from gaseous effluent containing about 1–15 mg/SCF hydrocarbons issuing from a heating unit employed in baking carbon anodes. Conditions of bed operation, including flow rates for the fluidizing medium, randomly removing solids used (in some cases coke and other aluminas, as shown in the table which follows), and other parameters, in addition to hydrocarbon removal efficiency, are given, in this example. When alumina was used, it had the following U.S. Sieve Series size:

| % on mesh | |
|---|---|
| 100 | 3.5 |
| 150 | 24.1 |
| 170 | 27.1 |
| 200 | 14.8 |

| | |
|---|---|
| 230 | 2.8 |
| 325 | 18.3 |
| Pan | 9.4 |

Inlet and outlet temperatures given in the following table are, respectively, for the gas approximately as it enters and as it leaves the bed which contains the randomly moving solid particles. The hydrocarbon removal efficiency (based upon benzene-soluble hydrocarbons) in % recorded in the table was determined by a gravimetric procedure in which the difference between the amount of hydrocarbons in milligrams per standard cubic foot (mg/SCF) in the inlet gas to the bed and the amount in the outlet gas from the bed, measured simultaneously, was divided by the amount of hydrocarbons in the inlet gas and multiplied by 100. This calculation may be represented by the following formula.

$$E_H = \frac{C_{HI} - C_{HO}}{C_{HI}} \times 100$$

It can be seen from the data in the table that at least in most instances about 95% by weight of the hydrocarbons in a gas contaminated therewith may be removed therefrom by use of our temperature-controlled fluidized bed arrangement.

Table

| Run No. | Effluent from Baking Electrode (ACFM)* | Processed Gas Stream (Effluent + Fluidizing Medium) | Average Gas Temp., °C Inlet Gas | Average Gas Temp., °C Outlet Gas | Average Bed Temperature °C | Feed Rate Average (lb/hr) | Feed | Average Efficiency (%) of Hydrocarbon Removal | Water Coolant (GPM) | Heat Removed (BTU/hr) |
|---|---|---|---|---|---|---|---|---|---|---|
| 1 | 1440 | 1540 | 169 | 62 | 74 | 115 | Coke | 86 | 20 | 108,000 |
| 2 | 1520 | 1650 | 181 | 62 | 73 | 115 | Coke | 94 | 20 | 132,000 |
| 3 | 1135 | 1465 | 157 | 48 | 55 | 115 | Coke | 96 | 20 | 102,000 |
| 4 | 1160 | 1485 | 150 | 48 | 55 | 65 | Coke | 99 | 20 | 108,000 |
| 5 | 1120 | 1400 | 148 | 52 | 65 | 65 | Coke | 96 | 1½ | 48,000+ |
| 6 | 1140 | 975 | 166 | 31 | 36 | 115 | Al₂O₃ | 96 | 20 | 156,000 |
| 7 | 1165 | 1065 | 156 | 34 | 37 | 82 | Al₂O₃ | 100− | 20 | 180,000 |
| 8 | 1185 | 1200 | 182 | 45 | 70 | 82 | Al₂O₃ | 100 | 2 | 95,000 |

*Actual Cubic Feet per Minute

EXAMPLE 2

Off-gas from a ring furnace containing by volume in terms of non-hydrocarbon gases, 89.4% $N_2$, 6.0% $O_2$, 2.0% $CO_2$, 1.0% CO, 1.1% Ar, 0.1% $H_2$ and 0.4% $H_2O$, plus about 0.02% by weight condensable hydrocarbons such as anthracene and chrysene, was passed through a fluidized bed of alumina maintained at about 60°C. About 96% by weight of the condensable hydrocarbons was removed by deposition on the alumina.

While the invention has been described in terms of preferred embodiments, the claims appended hereto are intended to encompass all embodiments which fall within the spirit of the invention.

What is claimed is:

1. A process for the prevention of pollution by the removal of undesirable hydrocarbons from a gas which comprises:
   a. fluidizing solid particles with a fluidizing medium substantially free of hydrocarbons depositable on the particles;
   b. cooling the particles to a temperature not exceeding the condensation temperature of said hydrocarbons;
   c. introducing said hydrocarbon-contaminated gas at a point spaced from the entry point of said fluidizing medium and at a temperature exceeding the condensation temperature of said hydrocarbons; and
   d. removing said hydrocarbons from said contaminated gas through deposition on said particles.

2. The process of claim 1 wherein the solid particles are selected from the group consisting of alumina, carbon and sand.

3. The process of claim 1 wherein the solid particles comprise alumina.

4. The process of claim 1 wherein the fluidized particles are maintained at a temperature of less than about 125°C.

5. The process of claim 1 wherein the fluidized particles are maintained at a temperature of from about 35°C to about 80°C.

6. The process of claim 1 wherein said hydrocarbon-contaminated gas is introduced through a nozzle having an outlet spaced from the wall of the heat exchanger chamber containing said fluidized particles and is maintained at a temperature above the condensation temperature of said hydrocarbons by heating or insulating said nozzle.

7. The process of claim 1 wherein said particles are fluidized by passing said fluidizing medium through openings in a distribution plate beneath the solid particles and said fluidizing medium is essentially free of material condensable on said distribution plate.

8. The process of claim 1 wherein said contaminated gas is introduced into the zone of fluidized particles at a velocity sufficient to prevent counterflow of the particles.

9. A process for the removal of undesirable hydrocarbons from a gas contaminated therewith comprising:
   a. fluidizing a bed of alumina particles with a substantially hydrocarbon-free gas introduced into said bed through a distribution plate at a predetermined fluidizing velocity;
   b. cooling the bed to a temperature of less than about 125°C;
   c. introducing said hydrocarbon-contaminated gas at a point spaced from said distribution plate through a nozzle maintained at a temperature above the condensation temperature of said hydrocarbons by heating or insulating said nozzle, said gas being introduced into the zone of fluidized particles at a velocity sufficient to prevent counterflow of the particles;
   d. removing said hydrocarbons from said contaminated gas through deposition on said alumina particles.

\* \* \* \* \*